United States Patent [19]
Holler

[11] Patent Number: 5,082,568
[45] Date of Patent: Jan. 21, 1992

[54] METHOD FOR REMOVING LOW CONCENTRATIONS OF METAL CONTAMINANTS FROM WATER

[75] Inventor: Thomas D. Holler, Sheboygan, Wis.

[73] Assignee: Ametek, Inc., Sheboygan, Wis.

[21] Appl. No.: 655,118

[22] Filed: Feb. 14, 1991

Related U.S. Application Data

[62] Division of Ser. No. 325,245, Mar. 17, 1989, Pat. No. 5,024,764.

[51] Int. Cl.$^5$ ............................................. C02F 9/00
[52] U.S. Cl. .................................... 210/679; 210/688; 210/912
[58] Field of Search ............... 210/686, 688, 694, 266, 210/484, 489, 496, 497.01, 503, 504, 679, 912-914; 264/86, 112

[56] References Cited

U.S. PATENT DOCUMENTS

| | | | |
|---|---|---|---|
| 3,250,702 | 5/1966 | Levendusky | 210/686 |
| 3,289,847 | 12/1966 | Rothemund | 210/266 |
| 3,375,933 | 4/1968 | Rodman | 210/506 |
| 3,420,709 | 1/1969 | Barrett et al. | 210/503 |
| 4,032,457 | 6/1977 | Matchett | 210/489 |

Primary Examiner—Ivars Cintins
Attorney, Agent, or Firm—Andrus, Sceales, Starke & Sawall

[57] ABSTRACT

A composite cartridge-type filter effective to substantially reduce low but hazardous concentrations of lead in drinking water to acceptable levels utilizes a porous activated carbon block filter and a powdered deionizing resin which is converted to an ion exchange resin in situ and during use of the filter. The method of operation of the filter results in a substantially extended life for lead removal as compared to similar disposable cartridge filters. The composite filter is also affective in removing dissolved metals which are leached from the soluble ash fraction of the carbon block itself. Powdered deionizing resin, having a greatly enhanced active surface area as compared to the resin beads from which it is formed, is formed by fracturing the resin beads in situ in a slurry filling and drying process which provides a stable packed resin bed.

11 Claims, 1 Drawing Sheet

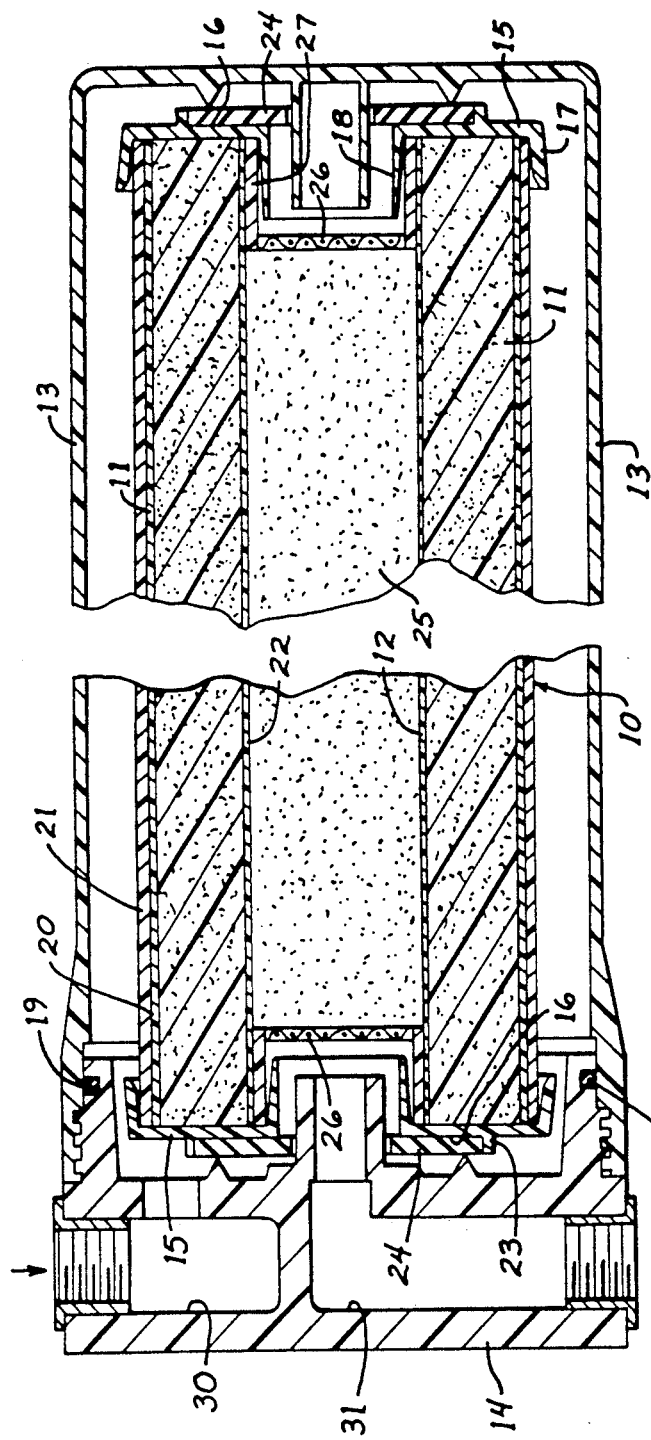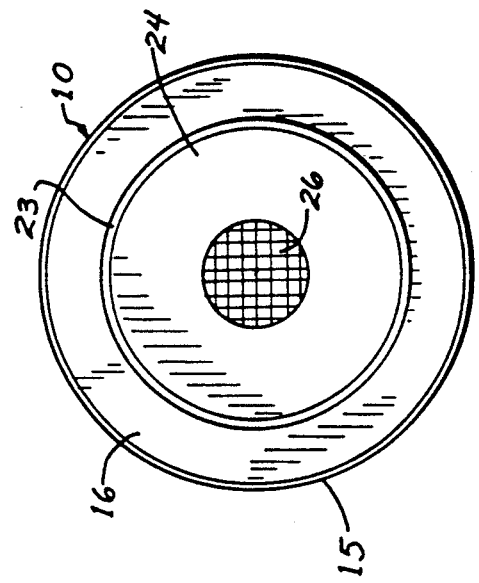
FIG. 1
FIG. 2

METHOD FOR REMOVING LOW CONCENTRATIONS OF METAL CONTAMINANTS FROM WATER

This is a divisional application of Ser. No. 07/325,245, filed Mar. 17, 1989, now U.S. Pat. No. 5,024,764.

BACKGROUND OF THE INVENTION

The present invention relates to a filter for removing dissolved solids from water, and more particularly to a composite cartridge-type filter effective in the removal of low concentrations of heavy metals from drinking water and other metals from aqueous solutions in medical treatment processes. The invention also relates to the method of operation of the filter and the method by which the filter is made.

Small cylindrical tubular filters of various types of filter material useful in treating domestic water supplies are well known in the art. Activated charcoal or carbon material has been used quite widely because of its ability to absorb and filter a wide range of dissolved and suspended solids, as well as dissolved gases. To alleviate the problem of handling and retaining powdered activated carbon filter material, porous blocks of plastic-bonded powdered activated carbon have been developed. Such porous filter blocks are commonly formed in a long cylindrical shape with a hollow axial interior. This cylindrical filter block is placed in a suitable housing and water to be filtered is supplied in a manner such that it flows radially inwardly through the porous filter block to the hollow interior from which it is collected for use. It is also known to fill the hollow interior of the cylindrical block with another filter material in particulate form to provide supplemental treatment of the water.

U.S. Pat. No. 3,289,847 (Rothemund) shows a dual bed filter comprising a hollow cylindrical outer filter having its interior filled with a different type of particulate filter material. Activated carbon and an ion exchange resin are disclosed for use in the two filter beds. U.S. Pat. No. 4,032,457 (Matchett) discloses a tubular cylindrical filter cartridge containing activated carbon in a bonded matrix. In one embodiment, the hollow interior of the cartridge may be filled with a particulate ion exchange resin. U.S. Pat. No. 3,375,933 (Rodman) shows a cylindrical tubular filter module comprising activated carbon particles encapsulated in a polymer. It also discloses a similar filter module comprising a powdered ion exchange resin similarly encapsulated in a suitable polymer. The use of a mixture of cation and anion exchange resins is also disclosed.

Polymer-bonded powdered activated carbon filter blocks have gained widespread use in drinking water filter systems. Activated carbon is known to be effective for the removal of a wide range of dissolved and suspended solids, including metals and other dissolved minerals, colloidal and other suspended solids, dissolved gases, and even bacteria. As indicated, it is also know to combine other filter materials with porous activated carbon blocks to provide series filtration for materials not removed by the carbon or to supplement the carbon filter removal. Thus, for example, the interior of a hollow cylindrical carbon block filter may be filled with a particulate ion exchange resin to remove dissolved calcium, magnesium and the like to effect softening of the water.

Activated carbon is also known to be effective in absorbing heavy metals, such as lead, mercury and cadmium. Dissolved heavy metals, of course, are known to pose potential health problems and their removal from or limitation to low concentrations in drinking water supplies has become a significant concern. There are, however, significant practical limitations on the use of porous activated carbon block filters for heavy metal removal. The removal efficiency of such activated carbon blocks diminishes fairly rapidly with the total volume of water passed through the filter. Increasing the amount of carbon block filter material has practical limitations from the standpoint of size as well as the consequent restriction on the flow rate of water through it. Thus, when a hollow cylindrical carbon block filter is used for the removal of a heavy metal, such as lead, the size of such a filter conventionally used in home filtration of drinking water will fairly rapidly reach it absorption level for lead and, thereafter, lead ion breakthrough will occur. Although the filter block may still retain substantial capacity for the removal of other dissolved or suspended solids, its lead removal capability is lost.

It is also known in the art to utilize ion exchange compositions, in conjunction with an activated carbon filter, to remove dissolved minerals which contribute to water hardness. Thus, for example, the hollow interior of a cylindrical carbon block filter may be filled with a cation exchange resin such that the water initially passing through the carbon block into the cation exchange resin will be softened through the removal of calcium and other ions contributing to hardness. However, within the range of sizes practically useful for the treatment of a domestic drinking water supply, the ion exchange material becomes rapidly saturated and must be replaced or regenerated after only a relatively small total volume of water has been treated. Further, these ion exchange compounds have not been found to be effective for heavy metal removal because of their preferential affinity for the more highly concentrated ions of calcium and the like for which they are specifically formulated.

Concentrations of lead in municipal drinking water supplies have recently been found to have reached dangerously high levels in many areas. Since the source of the dissolved lead may not be the initial water source, but rather in the transmission system used to carry the water from a centralized treatment plant to the user, systems for the removal of lead from drinking water at the point of consumption have become increasingly important. Such systems must not only be effective to broadly reduce lead (or other heavy metal) concentrations below hazardous levels, but the systems must be capable of treating a reasonably large volume of water before replacement and they must have a reasonable cost. Even in worst case situations, lead levels in municipal drinking water have not generally exceeded 200 parts per billion (ppb). This level is considered to be a low concentration relative to other dissolved minerals typically found in drinking water, such as calcium which may easily reach 200 parts per million (ppm). However, the current EPA standards establish a maximum acceptable concentration of lead in drinking water at 50 ppb and a change in that standard reducing the acceptable concentration to 10 ppb is expected. Therefore, an effective and relatively inexpensive system for removing dissolved lead to levels below the maximum allowable concentration would be most desirable.

Granular activated carbon filters are also utilized after reverse osmosis membrane filtration in certain medical applications. Dissolved minerals generally present in water act as natural buffers which decrease the ability of the water to dissolve additional minerals. However, an RO membrane may remove as much as 85%-95% of the natural buffers from treated water. With a substantially lower level of these natural buffers, the water becomes a much more aggressive solvent. When granular activated carbon is incorporated in a filtering system after an RO membrane, the more aggressive water may actually dissolve or leach certain minerals and metals from the soluble ash comprising from 7%-12% of the activated carbon. A reverse osmosis/granular activated carbon filter system may be used, for example, in a kidney dialysis process and certain metals extracted by the post-RO water from teh carbon may actually be hazardous or toxic to a kidney dialysis patient. Aluminum is one metal contained in the soluble ash fraction of granular activated carbon and is known to be a potential hazard to dialysis patients. A system for removing aluminum and other hazardous metals in these applications would also be very desirable.

SUMMARY OF THE INVENTION

The present invention is directed to a filter apparatus and method of its operation for the effective removal of low concentrations of a heavy metal, such as lead, from a drinking water supply. The apparatus and filter are also useful in removing dissolved metals from process water in certain medical applications. The invention also includes the method of preparing the composite filter apparatus.

In its preferred embodiment, the composite filter includes a hollow cylindrical body of polymer-bonded activated carbon particles, the hollow interior of which is filled with a bed of particulate material including a fractured cation deionizing resin. The composite filter apparatus is uniquely suitable for removing low concentrations of lead by initially utilizing the lead absorption properties of the carbon block, passing the water from the carbon block directly through the cation deionizing resin bed whereby the deionizing resin is converted into an ion exchange resin through the non-selective absorption of the cations contained in the water. As the water passing through the carbon block filter continues through the ion exchange resin material, the lead or other heavy metal ions will be removed via ion exchange with less reactive cations in the ion exchange resin.

The bed of particulate material within the hollow interior of the cylindrical carbon block filter preferably comprises a mixed bed of fractured cation and anion deionizing resins to maintain the proper pH balance and stoichiometric balance in the filtered water. To enhance the ion absorption capacity of the deionizing resin material, as well as the ion exchange capability of the exchange resin to which it is subsequently converted, the resin bed preferably comprises resin beads which are broken into a fine powder, thereby providing an enhanced active surface area. In the unique method of preparing the filter apparatus, conventional deionizing resin beads are mixed in an aqueous slurry which is then used to fill the interior of the hollow cylindrical carbon block. The water is then removed from the slurry and the beads are dried, causing them to fracture in situ to a fine powder material. Although the deionizing resin material shrinks upon drying, it subsequently re-expands when saturated by water in use to provide a packed particulate bed less subject to channeling and short circuiting.

The composite filter apparatus of the present invention utilizes the lead ion absorptive capability of the activated carbon block and, as that capability decreases, the ion exchange mechanism provided by the converted deionizing resin provides supplemental lead ion removal. The useful life of the carbon block filter is substantially extended and filtered drinking water may be supplied in volumes considerably larger than those previously attainable with dissolved lead levels substantially below the allowable maximums.

The composite filter of the present invention may also be applied in certain critical medical applications and used to provide removal in the dionizing resin bed of hazardous metals leached from the cylindrical carbon filter block by purified process water which is particularly aggressive. Thus, a granular activated carbon filter cartridge used in post-reverse osmosis filtration may be provided with an interior dionizing resin bed to remove hazardous metals unavoidably leached from the carbon block.

BRIEF DESCRIPTION OF THE DRAWINGS

FIG. 1 is longitudinal section through the axis of the composite filter cartridge of the present invention.

FIG. 2 is an axial end view of the cartridge shown in FIG. 1.

DETAILED DESCRIPTION OF THE PREFERRED EMBODIMENT

The composite filter 10 of the present invention comprises a cylindrical block 11 of bonded powdered activated carbon with a hollow axial open interior 12. The activated carbon particles are typically bonded with a polyolefin and the resultant structure may have a porosity in the range of 0.4-0.5 micron, all in a manner well known in the art.

The cylindrical filter block 11 is adapted for insertion, as a filter cartridge, into a suitable housing 13 and enclosed therein with a removable cover 14. The cylindrical filter block is provided with protective plastic end caps 15 which protect the ends of the block from damage and provide an interface for sealing the cartridge within the housing 13. Each end cap 15 includes an outer annular portion 16 and integral outer and inner sleeves 17 and 18 adapted to overlie the ends of the outer and inner cylindrical surfaces of the filter block. The outer surface of the block 11 may include an inner wrap of a relatively fine polyolefin prefilter material 20 and an outer wrap 21 of a material having a more open construction made, for example, of polypropylene. The ID of the tubular block may also be provided with a polypropylene wrap 22 similar to the prefilter wrap 20. These wrappings provide a prefiltering of larger particles from water entering the filter block and help prevent particles shed from the surface thereof from entering the water.

The flat annular portion 16 of each end cap is provided with an integral annular ridge 23 inside which a sealing gasket 24 may be placed to provide a water-tight seal between the ends of the cartridge and the inside of the housing 13. A suitable O-ring 19 may be used to seal the interfaces between the cover 14 and the housing 13. Optional O-ring seals of various types known in the art may be used to adapt the filter cartridge to other kinds of housings or to provide supplemental sealing for greater overall sealing integrity.

The hollow open interior 12 of the filter block 11 is filled with a powdered deionizing resin 25. For the purposes of the present invention, a cation deionizing resin is utilized. The resin comprises a cation deionizing resin in the hydrogen form having styrene-DVB (divinylbenzene) sulfonic copolymer active group. To maintain a proper pH balance and stoichiometric balance in the filtered water, the deionizing resin 25 preferably includes an anion deionizing resin mixed with the cation resin previously described. The anion deionzing resin comprises one in the hydroxide form in which the copolymer active group is styrene-DVB quarter ammonium hydroxide. A 50/50 mixture by weight of the foregoing deionizing resins has been found suitable.

Deionizing resins of the type described above are typically produced in the form of relatively large spherical beads having a mesh size typically of 16×50. Although such resin beads are normally used directly in this form for various deionizing applications, the active surface area which they provide in this form is insufficient to provide the deionizing/ion exchange activity required for the method of the present invention, as will be described hereinafter. Therefore, both to facilitate filling the hollow interior of the cylindrical carbon block and to provide a particulate deionizing resin material with the requisite surface area, the filter cartridges are filled by preparing an aqueous slurry of deionizing resin beads which may comprise a mixture of cation and anion resins in any desired proportion. The open interior 12 of the cylindrical block 11 is filled with the aqueous slurry of resin beads and the water is removed from the slurry. Most of the water may be removed simply by allowing it to drain out of one end of the filter cartridge and then subjecting the beads to an appropriate drying process. When the deionizing resin beads are initially placed in water to form the slurry, the beads undergo substantial expansion. The subsequent drying process causes the beads to contract and fracture into a relatively fine powder having an average particle size somewhat larger than 200 mesh.

Ordinarily, powdered deionizing resin materials are not useful as packed bed material because the fine particle size makes them too difficult to handle. Referring briefly to the drawings, a fine mesh polypropylene screen 26 is placed at each end of the open cylindrical interior of the filter block to retain the powdered resin material therein. The screen 26 may have, for example, a 200 mesh size and be attached to a cylindrical mounting sleeve 27 adapted to fit under the inner sleeve 18 of the end cap 15. Obviously, one end must be left open to allow the interior of the cartridge to be filled with resin beads, after which cylindrical mounting sleeve 27 with attached screen 26 is positioned and that end is closed with the end cap 15. The deionizing resin material which has fractured and shrunk during drying will re-expand upon being wetted in use by the water being treated. Re-expansion of the powdered deionizing resin will cause the material to tightly fill the open interior 12 and pack the material tightly enough to resist channeling.

The principal intended application of composite filter apparatus of the present invention is to provide a method for removing low concentrations of heavy metal ions, particularly lead, from a drinking water supply. In particular, a relatively small filter cartridge is capable of treating a normal volume of household drinking water to reduce low, but potentially hazardous, concentrations of dissolved lead (or other heavy metals) to levels below designated hazardous concentrations. In addition, the porous activated carbon block filter will also remove other dissolved or suspended materials in a typical manner known in the art.

Water to be treated is directed through the inlet opening 30 in the cover 14 from which it passes into the cylindrical space between the inside of the housing 13 and the outside of the cylindrical filter block 11. Water pressure causes the water to flow radially inwardly through the porous carbon block, into and through the deionizing resin 25, axially through the screen 26 at the cover end, and out of the outlet opening 31 in the cover 14. Along with its other filtering and/or absorption capabilities, the carbon will retain some of the lead and other heavy metal ions when present in relatively low concentrations. In time and depending on the flow volume and size of the porous filter material, as well as the lead ion concentration, the ability of the carbon block to retain lead ions will diminish. As this occurs, there will be a breakthrough of lead ions into the powdered deionizing resin on the interior of the filter module. Although the cation deionizing resin will readily capture the lead ions which breakthrough the porous carbon block, other cations which are typically in much greater concentrations than lead or other heavy metals will rapidly overrun the deionizing resin and be absorbed thereon. For example, the concentration of calcium in drinking water may be 3 or 4 orders of magnitude greater than the concentration of lead. It has been found, however, that the cation deionizing resin, when saturated, is converted to an ion exchange resin. Although the resin will typically be saturated with the cations in highest concentrations in the water, such as calcium, the more reactive lead ions which breakthrough the carbon filter will replace the calcium and other less reactive cations by conventional ion exchange. It has been found that, at relatively low concentrations of lead, for example, 200 ppb or less, the method will effectively reduce lead concentrations to well below 25 ppb and, utilizing a filter cartridge of conventional size, the method and apparatus can be used to treat a volume of water far in excess of that utilizing a carbon block filter alone or a carbon block filter with a conventional ion exchange resin.

A composite filter module was prepared utilizing a 12" long cylindrical activated carbon block having a 2.61" OD, a 0.62" wall thickness, and an open interior with a diameter of 1.37". The open interior was filled with a powdered deionizing resin mixture comprising equal parts by weight of the cation and anion deionizing resins identified above. The mixed resin bed between the end screens 26 was 10.50" long. In a test of this filter module, 2,300 gallons of water containing 200 ppb lead was treated without the concentration of lead in the effluent exceeding 25 ppb. The concentration of lead in the first 750 gallons of water through the filter module was less than 10 ppb.

A composite filter module was also prepared utilizing a 9⅞" long cylindrical carbon block having same I.D. and O.D. as in the preceding example. The same construction and resin mixes were incorporated into a 8⅜" long mixed bed resin column on the interior of the carbon block. In a test of this filter module, 1,400 gallons of water containing 150 ppb lead was treated with the same results as the 12" module, i.e. less than 25 ppb lead in the filtered water.

By determining the lead concentration in the water supply to be treated, the composite filter module of the present invention may be utilized for an estimated period of time based on the average daily volume of water used and simply replaced on a timed basis. The extended lifetime provided by the dual filtering capability and the unique conversion of the deionizing resin to an ion exchange resin provides a disposable cartridge filter which is very efficient and cost effective.

A porous carbon block filter 11 of the type hereinabove described may also be used as a final filter for the filtrate water from a reverse osmosis membrane system of the type used in certain medical applications. Thus, the filtrate from an RO system utilized in a kidney dialysis process may be passed through a carbon block filter for the absorption of dissolved gases or the like. However, the highly purified water filtrate from the RO membrane may be substantially free of the nature buffers and, therefore, comprise a substantially more aggressive solvent. When passed through the activated carbon block, the highly purified water may actually dissolve certain mineral or metal inpurities typically present in the carbon block, which impurities are then leached into the filtered water. Aluminum has been found to be particularly hazardous to dialysis patients when leached from the final carbon filter.

The addition of a deionizing resin bed 25 to a cylindrical carbon block filter 11, as previously described, will remove dissolved aluminum and other heavy metals which might be leached from the carbon block. The use of a mixed resin will also help maintain the stoichiometric balance and the total function of the composite filter of this embodiment will remove potentially hazardous dissolved metals and produce a higher quality water in many RO applications.

Apart from the substantially lower total dissolved solids in the water being treated, the foregoing embodiment of the invention operates in a manner similar to the primary embodiment. Thus, a reverse osmosis filtrate may contain only 10% of the total dissolved solids present before RO treatment. Of those dissolved solids, those passing through the carbon block 11 are absorbed by the deionizing resin 25 along with aluminum and other metals which might be leached from the carbon. As the resin becomes saturated, it begins to operate on an ion exchange principle, exchanging more active aluminum for the dominant but less reactive cations, such as calcium, previously absorbed on the deionizing resin.

I claim:

1. A method for removing low concentrations of heavy metal ions from a supply of water comprising the steps of:
   (a) passing the water supply through a block of bonded activated carbon to initially remove a portion of the heavy metal ions;
   (b) directing the water supply from said carbon block through a bed containing a non-selective cation deionizing resin in hydrogen form to remove a portion of the cations contained therein, including a portion of the heavy metal ions passing through said carbon block, and to convert said deionizing resin to a heavy metal-selective ion exchange resin; and,
   (c) continuing to direct the water supply from said carbon block through said converted resin bed to remove a portion of said heavy metal ions by ion exchange with less reactive cations in said ion exchange resin.

2. The method as set forth in claim 1 wherein the heavy metal ions comprise lead ions.

3. The method as set forth in claim 2 wherein the concentration of lead ions in the water supplied to the carbon block is less than 200 ppb.

4. The method as set forth in claim 2 including the step of terminating the method when the concentration of lead ions in the water leaving said converted resin bed is greater than a selected maximum concentration.

5. The method as set forth in claim 1 wherein the deionizing resin bed comprises fractured resin beads.

6. A method for removing low concentrations of dissolved metals leached from a granulated activated carbon filter by treated water passing therethrough, comprising the steps of:
   (a) preparing a bed of powdered cation deionizing resin in hydrogen form;
   (b) directing the water from said carbon filter through the resin bed to remove a portion of the cations contained therein, including said dissolved metals, and to convert said deionizing resin into an ion exchange resin preferential to said dissolved metal ions; and,
   (c) continuing to direct the water through said converted resin to remove said dissolved metal ions by ion exchange.

7. The method as set forth in claim 6 wherein the resin bed comprises a mixture of cation and anion deionizing resins.

8. The method as set forth in claim 6 wherein the carbon filter comprises a hollow cylindrical body of bonded activated carbon particles and the step of preparing the resin bed includes:
   (a) filling the hollow interior of the carbon filter with deionizing resin beads; and,
   (b) causing the resin beads to fracture in situ.

9. A method for removing low concentrations of heavy metal ions from a supply of water which also contains a predominant concentration of cations less reactive than said heavy metal ions, comprising the steps of:
   (a) passing the water supply through a bonded activated carbon filter to initially remove a portion of the heavy metal ions;
   (b) providing a bed of a saturated deionizing resin in hydrogen form which has been converted by saturation into a heavy metal-selective ion exchange resin containing predominantly said less reactive cations; and,
   (c) directing the water from said carbon filter through said resin bed to remove at least a portion of the heavy metal ions overrunning said filter by ion exchange with less reactive cation in said ion exchange resin.

10. The method as set forth in claim 9 wherein said method is carried out in a filter chamber and including the step of converting said deionizing resin within the chamber.

11. The method as set forth in claim 10 wherein said deionizing resin comprises a styrene divinylbenzene sulfonic copolymer active group.

* * * * *